Dec. 1, 1942.  T. B. FARRINGTON  2,303,626
LAMP SUSPENSION AND POSITIONING STRUCTURE
Filed April 24, 1940  2 Sheets-Sheet 1
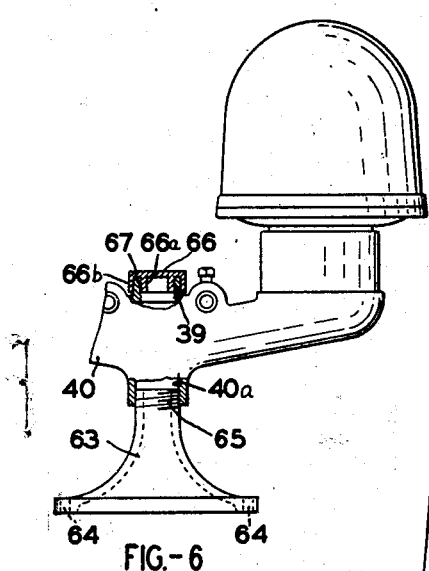
FIG.-6
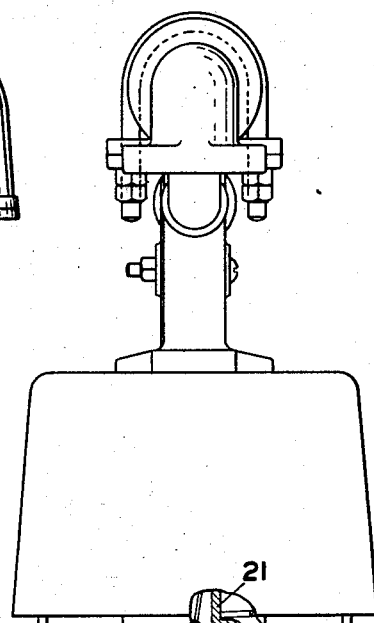
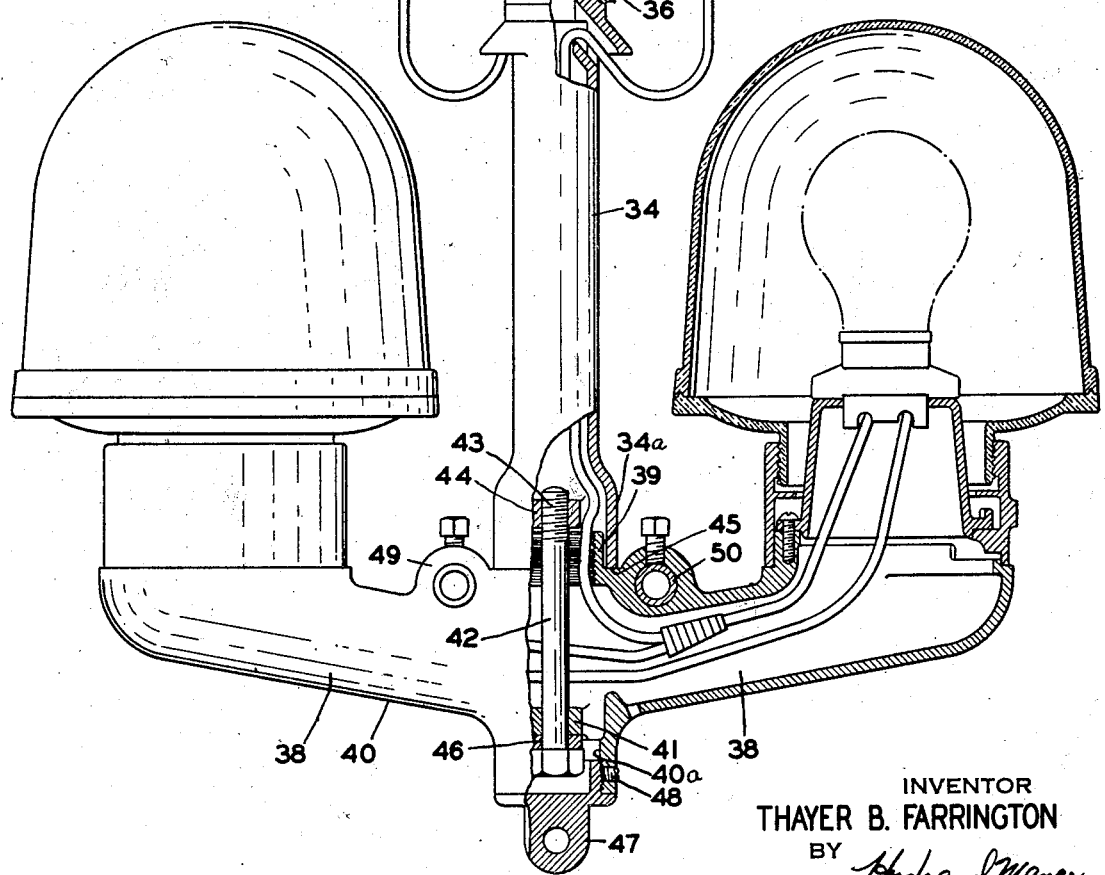
FIG.-1
INVENTOR
THAYER B. FARRINGTON
BY *Hyde and Meyer*
ATTORNEYS

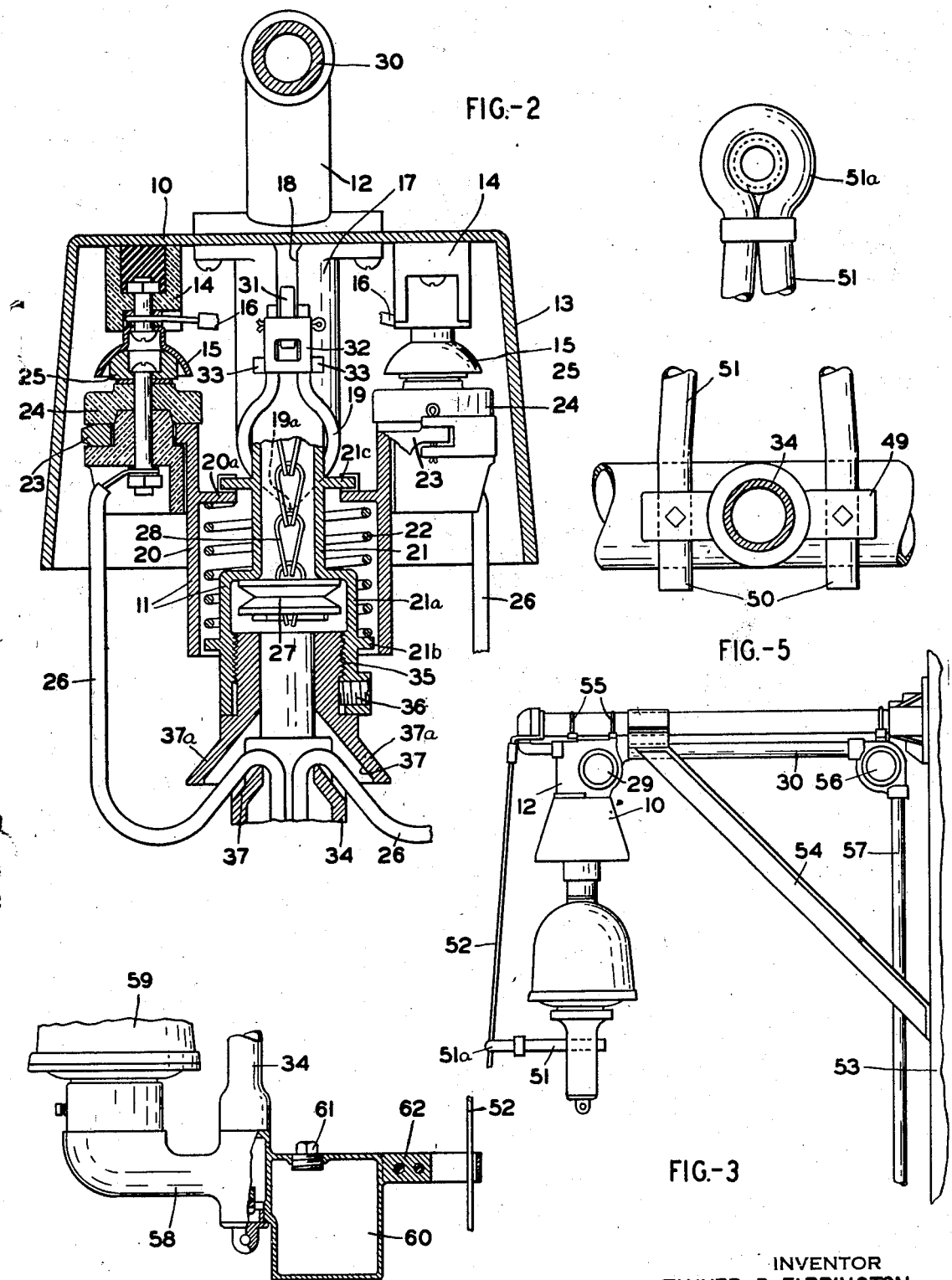

Patented Dec. 1, 1942

2,303,626

UNITED STATES PATENT OFFICE 2,303,626

LAMP SUSPENSION AND POSITIONING STRUCTURE

Thayer B. Farrington, Cleveland Heights, Ohio

Application April 24, 1940, Serial No. 331,303

2 Claims. (Cl. 177—352)

This invention relates to improvements in lamp suspension and positioning structures, and more particularly to a structure especially adapted to support definitely positioned lamps in places difficult of access, such as airplane obstruction lights on tall objects.

As will be understood by those acquainted with this industry, lights placed on tall chimneys, stacks, towers, radio aerials and the like as a warning to airplanes, must be in certain definite positions so as to be visible from all angles. Code rules have been adopted to secure the proper placing of such obstruction lights. One difficulty in obtaining the general adoption of such lights is the cost of servicing and maintaining them, as this must be done regularly to insure continuity of service and generally requires the services of a steeple jack.

One object of the present invention, therefore, is to provide means operable from the ground or the top of a building, in any case some distance below the obstruction light, for lowering the light by means of a chain or cable so that the same may be serviced and again raised in position at the top or some mid portion of the obstruction remote from the operator with the assurance that the light when so positioned on the obstruction will be in a definite location which is predetermined at the time the light is first installed. In other words my invention provides means for lowering a lamp from a tall obstruction and the raising of that lamp again to operative position in exactly the predetermined position originally decided upon.

Other objects of the present invention include the arrangement of the parts thereof so as to be modified to meet various requirements, together with suitable means for holding all of the parts in their proper positions including means for guiding the lamp holding structure safely during raising and lowering operations.

My invention will be more clearly understood from the accompanying drawings and description and the essential features thereof will be set forth in the claims.

In the drawings, Fig. 1 is a view of one embodiment of my improved structure showing a pair of lamps fastened in raised or operative position with certain parts shown in section to more clearly denote the structure; Fig. 2 is an enlarged sectional view through the lamp hanger portion of the device of Fig. 1 to indicate how the parts operate; Fig. 3 is a smaller view showing one manner of suspending my device in position on an obstruction; Fig. 4 is a fragmental view in certain respects similar to the lower portion of Fig. 1 but illustrating the manner of suspending a single lamp; Fig. 5 illustrates one manner of attaching a guide to the lamp structure; while Fig. 6 illustrates how a portion of the fixture of Fig. 1 may be supported by a pedestal or the like attached at the bottom where suspension is unnecessary.

In Figs. 1 and 2 I have illustrated a lamp hanger construction comprising a main or fixed hanger member 10 and a lower lamp hanger member 11 adapted to enter into and be latched to the hanger member 10 in a certain definite and fixed position.

Briefly stated, the fixed lamp hanger member 10 is suspended generally by means of an overhead combined bracket and pulley 12 and includes a canopy 13 extending downwardly around the parts to completely enclose and protect them. Mounted on the top wall of the canopy are insulating members 14 which support fixed contacts 15. These are supplied with electricity through the wires 16 which usually enter either along the side wall or the top wall of the canopy. Rigidly secured to the fixed hanger member centrally of the canopy 13 is a hollow tubular guide 17 having a slot 18 extending through the wall thereof longitudinally for substantially the entire length of the guide. The lower end of the guide 17 is provided with a cam face 19 which slopes rearwardly and downwardly away from the points adjacent the slot 18 to an apex 19a at the bottom rearmost portion thereof.

The lower lamp hanger member 11 comprises an outer sleeve 20 provided with an inwardly extending flange 20a, and an inner sleeve or stem 21 having an enlarged portion 21a which carries an outwardly extending flange 21b. A spring 22 held between flanges 20a and 21b holds the two sleeves normally in the position of Fig. 2 which position is limited by the engagement of contacts 25 with contacts 15. This construction provides a yielding connection for unlatching the two hanger members as will later appear. The sleeve 20 at its upper end is provided with outwardly extending brackets 23 which support insulator blocks 24 which in turn carry the male contacts 25 adapted when the hanger members are engaged to feed current from the wires 16 to the wires 26 which in turn lead to the lamps.

Means for raising and lowering the lamp hanger member 11 is provided and comprises a washer or the like 27 secured to the end of a chain or cable 28 which passes upwardly through the hollow stem 21 and outwardly through the combined bracket and pulley 12, passing over a pulley in the general location of the circle 29 of Fig. 3 and thence through a conduit 30 to a suitable location.

Means is provided for guiding the stem 21 into a definite oriented position relative to the guide 17 when the two hanger members are engaged. This means comprises a fin 31 on the stem 21 which is adapted to ride along cam surface 19 and finally enter the slot 18 when the stem 21 is pulled up to enter the guide 17. Thus the stem 21 is always definitely oriented with respect to the fixed hanger member 10.

Means may be provided for latching the hanger members together after they have been engaged, although it will be understood that sometimes lamps in raised position are held there merely by the tension on the chain or cable 28. The means here provided comprises a latch dog 32 pivoted on a portion of the fin 31 and adapted to engage in notches 33 of the guide 17. The arrangement is such that when the chain 28 raises the stem 21 sufficiently to pull the latch dog above the notches 33 and then lowered slowly, the latch dog will enter the notches 33 and hold the parts safely in latched position. The parts are unlatched by lowering the stem 21 quickly so that the latch dog passes the notches 33. All of this structure is fully shown and described in my copending application Serial No. 298,982, filed October 11, 1939, to which reference may be had if the construction is not clearly understood.

My invention includes means for securing lamps to the lamp hanger member 11 and more especially to the stem 21 thereof in definite oriented position relative to the stem 21 so that when the lamp hanger member 11 is raised to latched position with respect to the member 10 the lamps connected with the member 11 will be in definite oriented position relative to the stem 21 and therefore relative to the guide 17 and the fixed hanger member 10. The means here shown comprises an elongated adapter 34 having at its upper end a threaded connection 35 with the lower end of the stem 21. A set screw 36 holds the threaded parts in definite position relative to each other after such a position has been determined. The adapter 34 is provided near its upper end with the inclined openings 37 for the entrance of the wires 26 protected by the canopy portions 37a against the entrance of dirt or moisture. To the lower end of the adapter 34 is secured a lamp supporting structure in definite oriented position relative to the adapter 34. In the form shown in Fig. 1, a pair of diametrically opposed arms 38 are connected together in a common rigid structure provided with an upstanding central annular flange 39 which enters in the lower flared end 34a of the adapter 34. The lamp supporting casting 40 is provided with a web 41 through a central opening in which passes a bolt 42 which has a threaded engagement at 43 with the web 44 of the adapter 34. By this means the lamp supporting casting 40 is drawn up into tight engagement with the adapter 34 so that friction at the point 45 is sufficient to hold the casting 40 in definite oriented position relative to the adapter 34. Lock washers 46 serve to maintain this condition. The casting 40 has a cylindrical opening 40a at the bottom through which the bolt 42 may be introduced. This opening is closed by a cap 47 which is held in position by a set screw 48. Each of the arms 38 supports a lamp structure of any suitable character, a lamp and globe of conventional form being here illustrated to indicate where these parts are positioned. Suitable wires to supply the lamps, such as those indicated at 26, are led downwardly through the adapter 34 and outwardly through the arms 38 as will be obvious to those skilled in this art. It will be noted in Fig. 1 that when the two lamps are held in raised and latched position their rays will converge and cross directly above the upper or fixed hanger member. This obviates any shadow from above. At the same time the globes surrounding the lamps are spaced apart sufficiently to permit the introduction of the adapter stem 34 between them for attachment to the orienting arms 38.

Means may be provided for guiding the lamp hanger member 11 and the attached lamp supporting structure during raising and lowering operations as shown in Figs. 1, 3 and 5. In the form here shown, ears 49 on the casting 40 are suitably bored to receive the ends 50 of a bracket 51 which provides a loop at 51a through which a guide cable 52 may be passed. This prevents abnormal swinging of the parts as they are raised and lowered and insures that the stem and guide are in their approximately correct position for engagement when the lamp hanger member 11 approaches the lamp hanger member 10.

It will be obvious that the stem 21 should be substantially alined with the guide 17 as the parts approach latching position and to this end the lamps are balanced on the arms 38 so that the stem 21 will be in an upright position and substantially alined with the guide 17 when the parts are raised for the latching operation.

Referring to Fig. 3, the structure thus far described is shown mounted upon an obstruction 53 by means of a bracket 54 secured thereto. The lamp hanger member 10 and the bracket portion 12 are suitably secured to the bracket 54 as by means of the U bolts 55. The guide wire 52 may also be secured to this bracket as indicated. The conduit 30 is led from the lamp hanger member to a position near the obstruction where a pulley 56 is provided connected with a conduit 57 leading toward the ground or top of the building as the circumstances may require. Obviously the chain 28 in Fig. 3 instead of being housed in the conduit 57 may be led to the ground in exposed position close to the hanger 10, in which case the bracket 51 may be turned 180° from the position shown in Fig. 3 with the chain 28 passing through the loop 51a so that the lowering chain 28 serves also to guide the lamp against undesirable swinging as it is lowered to the ground.

In the modification of Fig. 4 all of the parts are the same as above described down to and including the adapter 34. However, the modification shows the use of a single lamp only, such as is often mounted at some point below the top of the obstruction, for instance in an intermediate position on a stack. Here the lamp supporting arm 58 is secured to the adapter 34 in exactly the manner shown in Fig. 1 and a single lamp 59 is supported on the arm 58. To balance this lamp and to insure that the stem 21 is alined with the guide 17 a counterbalancing means 60 forms a portion of the structure 58 diametrically opposed to the arm which supports the lamp 59. As here shown the counterweight means comprises a chamber provided with a closed opening at 61 through which lead shot or slugs may be introduced sufficiently to provide an exact counterbalance for the lamp 59. In this form of the device a bracket 62 extends beyond the counterweight means 60 and is provided with an opening through which the guide line 52 may pass.

It is obvious from the preceding description that in any form of my device the fixed hanger member 10 may be placed in a predetermined position on the obstruction with the guide 17 and its slot 18 turned in a predetermined direction. Also the lamp arms 38 of Fig. 1 or 58 of Fig. 4 may be secured in a predetermined orientation with respect to the adapter 34 which in turn is secured in a predetermined orientation with respect to the stem 21 by means of the set screw 36. Therefore each time that the lamps are raised to latch position the lamps will have a definite predetermined orientation with respect to the structure on which they are mounted and will therefore always carry out the purpose for which they are intended. At the same time anyone can lower the lamps and service them and return them to the proper position at very little expense.

Fig. 6 is a modification showing how the lamp supporting casting 40 of Fig. 1 may be mounted upon a pedestal 63 where the obstruction lights are mounted directly upon a support beneath the lamps and where overhead suspension is unnecessary. The pedestal 63 may be a casting or stamping provided with openings 64 by which the pedestal may be bolted to a tower, roof or other supporting structure. It will be noted that the pedestal has a threaded connection at 65 with the cylindrical opening 40a at the bottom of casting 40. Preferably a cap 66 fits over the flange 39 of the casting 40 in a waterproof manner. In the form shown an internal flange 66a on the cap has a threaded connection at 67 with the flange 39 and an outer annular flange 66b of the cap extends outside of the flange 39 to provide a water-tight arrangement. When the device is formed in this manner the casting 40 with the two lamp supporting arms 38 may be utilized for both overhead suspended lamps and bottom supported lamps.

What I claim is:

1. Means for supporting warning lights comprising a fixed hanger member, a lowering hanger member separably mounted on said fixed hanger member, coacting latch means on said members for securing them in latched position, means for lowering said separable lowering hanger member, coacting orienting parts on said members relatively rotatable about a vertical axis, a pair of lamps carried by said lowering member on opposite sides of said axis, said orienting parts comprising means for rotating said lowering hanger member and the lamps carried thereby to definite preselected radial positions with respect to said axis as said lowering member moves into latched position and for definitely holding said lamps in said position, and said lamps being so spaced apart that in latched position the rays from the two lamps are adapted to converge and cross directly above the fixed hanger member.

2. Means for supporting warning lights comprising a fixed hanger member, a lowering hanger member separably mounted on said fixed hanger member, coacting latch means on said members for securing them in latched position, means for lowering said separable lowering hanger member, coacting orienting parts on said members relatively rotatable about a vertical axis, a plurality of lamps carried by said lowering member on different sides of said axis, said orienting parts comprising means for rotating said lowering hanger member and the lamps carried thereby to definite preselected radial positions with respect to said axis as said lowering member moves into latched position and for definitely holding said lamps in said position, and said lamps being so spaced apart that in latched position the rays from the lamps are adapted to converge and cross above the fixed hanger member.

THAYER B. FARRINGTON.